Dec. 30, 1958 T. IMMESBERGER 2,866,537

DEVICE FOR THE TRANSPORT OF CONTAINERS

Filed Oct. 5, 1954 4 Sheets-Sheet 1

INVENTOR
Theobald IMMESBERGER

INVENTOR
Theobald IMMESBERGER

INVENTOR
Theobald IMMESBERGER

DEVICE FOR THE TRANSPORT OF CONTAINERS
Filed Oct. 5, 1954 4 Sheets-Sheet 4
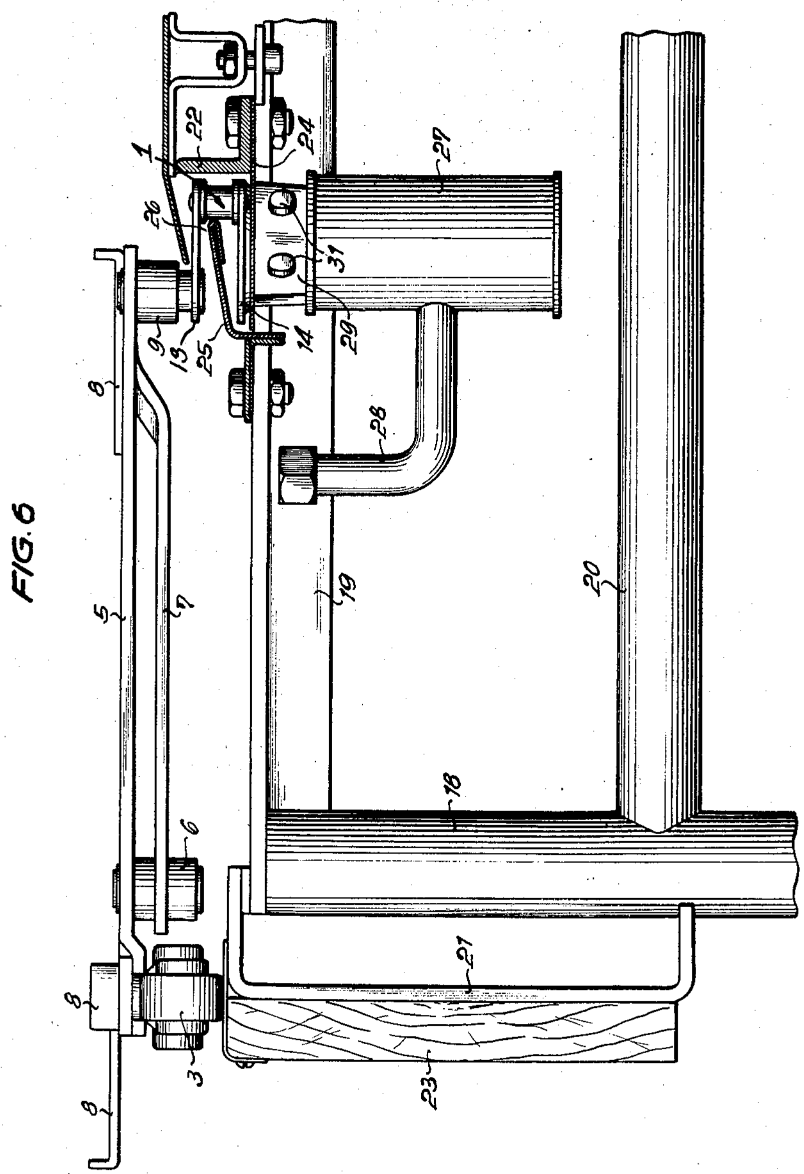
INVENTOR
Theobald IMMESBERGER United States Patent Office 2,866,537

Patented Dec. 30, 1958

2,866,537

DEVICE FOR THE TRANSPORT OF CONTAINERS

Theobald Immesberger, Kaiserslautern, Germany, assignor to G. M. Pfaff A.-G., Kaiserslautern/Pfalz, Germany, a corporation of Germany Application October 5, 1954, Serial No. 460,445

Claims priority, application Germany October 7, 1953

2 Claims. (Cl. 198—181)

The invention relates to a device for the transport of containers, boxes and the like.

This transport is being effected by an endless chain or band supported and driven in a closed horizontal cycle by wheels located upon vertical shafts.

The invention is preferably used in work places where the working machines are located along said band and on both sides thereof; it is advisable to load the articles to be transported in containers, which can be separated from the endless chain or band for loading or other work purposes.

Optimum working conditions prevail if the containers are located in a direct succession and with a possibly small space therebetween, as in this case the containers need not to be furnished with a table plate; still a dropping-down of the transported materials between the containers will not occur even if the latter are inaccurately charged or are removed; moreover, if using the device in a continuous cycle, it is possible to work simultaneously with an already advanced and with a following container.

With transport devices of the here denoted type being operated by an endless transport chain the operating width between the two longitudinal portions of the chain should be possibly reduced, since this measure enables a better utilization of the working space.

The main difficulties with regard to reduction of the distance between the containers and of the width of the installation arise at the reversal places of the chain since its driving wheels should have a possibly small size and since the containers or their carriers should move around from one into the opposite advance direction without enlargement of the distance between the two chain sections; a further postulate with regard to a satisfactory operation of transport devices of the present type consists therein that the containers or its bottom portion should have a rectangular shape to obtain a simple operation and an increased working capacity.

It is the object of the invention to comply with the above recited postulates in order to create a satisfactorily operative device for the transport and the displacement of containers and boxes by means of endless chains.

A preferable modification of the invention is illustrated by way of example in the attached drawings, wherein:

Fig. 6 is a lateral view of a part of the chain supporting structure.

Figure 1:
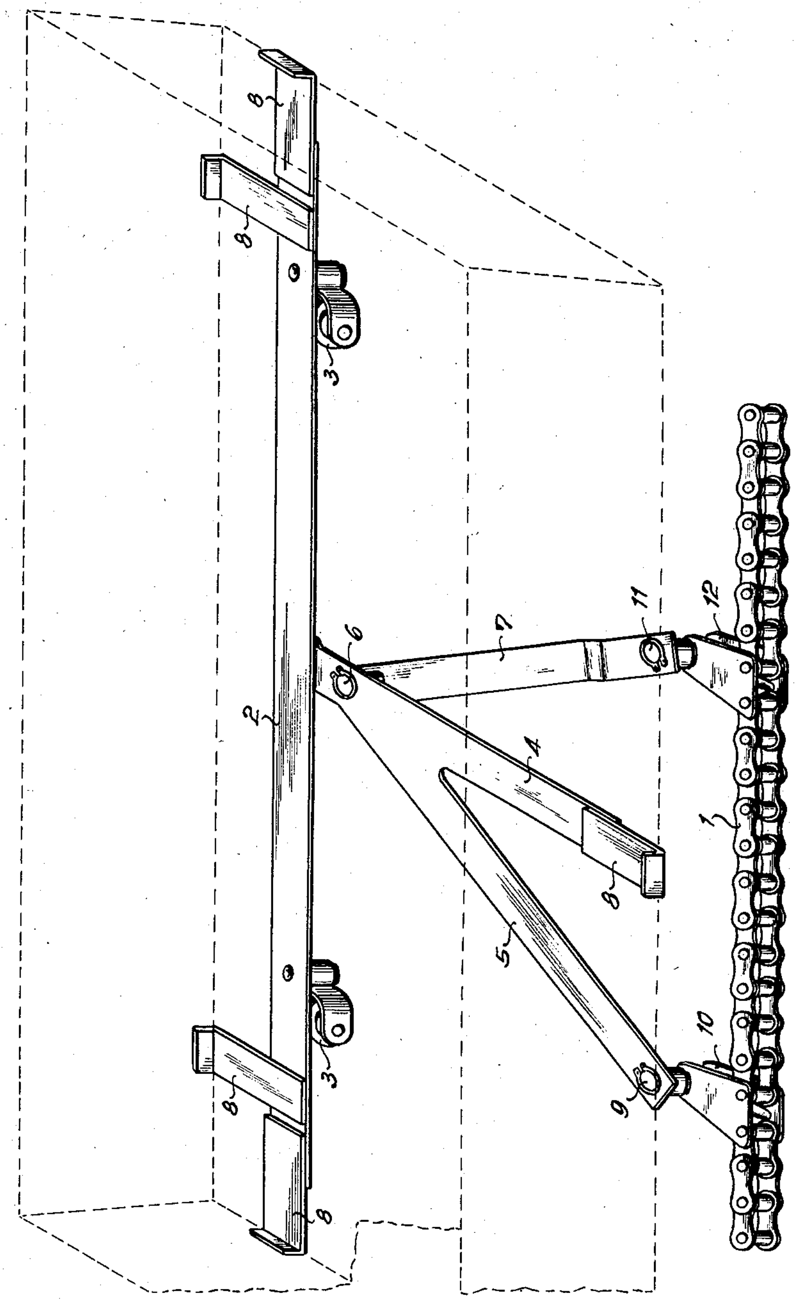
Fig. 1 is a perspective view of a part of a device for the displacement and the transport of containers by means of an endless chain.
Figure 2:
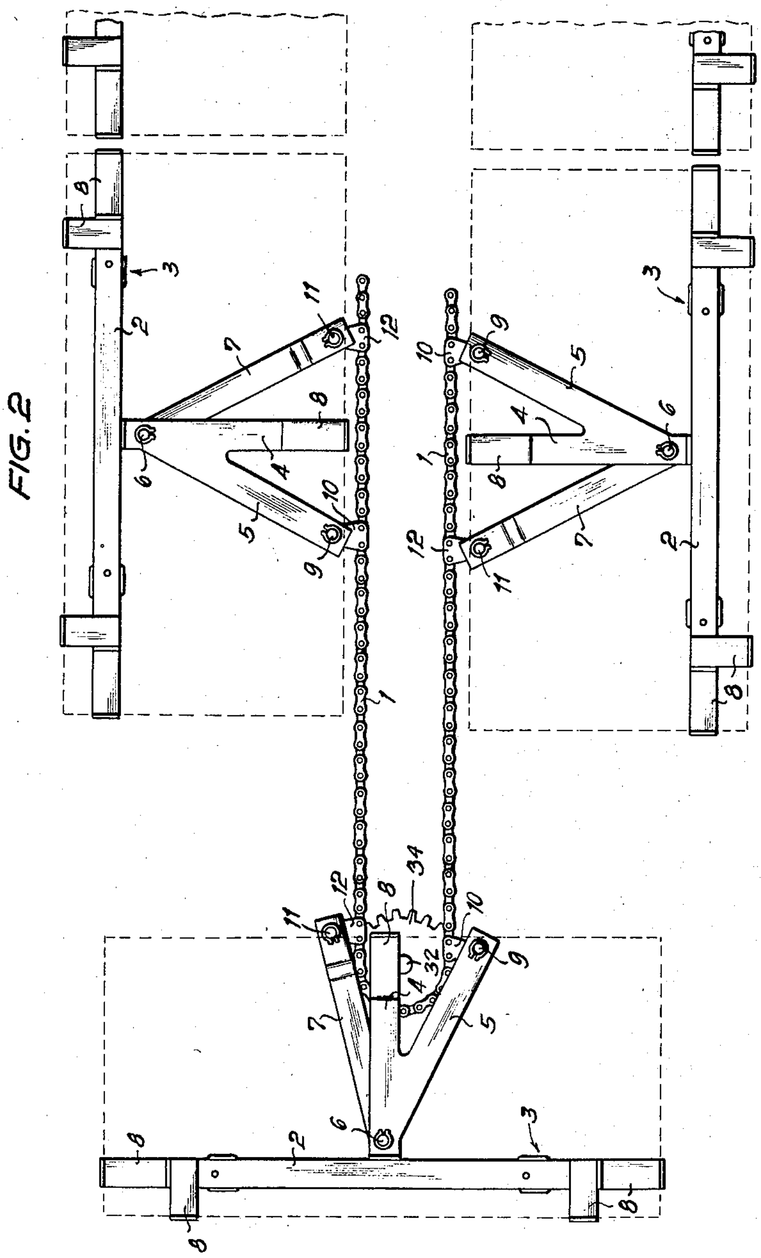
Fig. 2 is a top view of a part of the device showing the reversal point of the chain.

As apparent from the drawings the rectangular containers A indicated in Figs. 1 and 2 by dotted lines are for transport purposes located upon a supporting structure shown in Fig. 6. The transport of the containers A is effected by an endless chain 1 which at its reversal points is supported upon chain wheels 34, located upon vertical shafts 32.

The containers are by the carriers 2, Fig. 1, supported on swingable rollers 3 (Figs. 1, 6). The carriers are provided with an arm 4 extending towards endless chain 1; this arm 4 is rigidly connected with a lateral arm 5; a control arm 7 is by means of pivot 6 rotatably connected with arms 4, 5.

The carriers 2 and arms 4 are at their ends provided with angular holders 8. Arm 5 being rigidly connected with carrier 2 is rotatably connected with a pin 9 of the engaging member 10 of chain 1, Fig. 1.

A similar engaging member 12 is rotatably connected with the free end of control arm 7 by means of pin 11. The engaging members 10, 12 have upper plates 13 and lower plates 14, said plates 13 being solidly connected with the pins 9, 11, Fig. 3. The lower plates 14 are provided with a ridge-shaped slide-projection 16, see Fig. 3. The connecting plates of the arms 5, 7 with the chain are spaced from each other.

Figure 4:
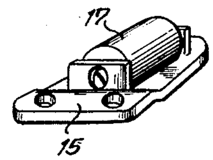
Fig. 4 is a perspective view of a further modification of the structure shown in Fig. 3.

In conformity with a further modification of the invention shown in Fig. 4 the plate 15 is provided with a roller 17 replacing the projection 16. The plates 13, 14 are connected with and projected from the chain 1, Fig. 1.

The support of the above described container transporting device consists of columns 18, crosswise carriers 19, 20 bars 21 and angular bars 22 as well as lateral boards 23, see Fig. 6. The lateral banks 23 are provided at the upper ends thereof with reinforcing strip bearing tracks for the swingable roller 3.

A chain supporting slide track 24, Fig. 6, is located underneath the angle bars 22 and a protective plate 25 having a rounded lateral edge 26 is fastened to the cross supports 19.

Figure 3:
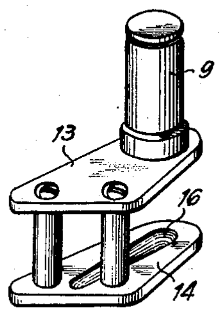
Fig. 3 is a perspective view of the structure operatively connecting the chain and the container advancing means.
Figure 5:
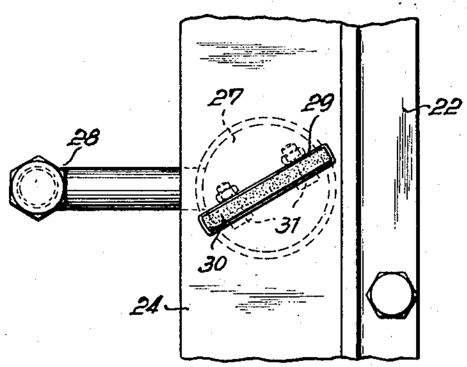
Fig. 5 is a top view of the chain slide track at the place of its lubrication.

Lubricating vessels 27, Fig. 5, having a feed tube 28 and a wick holder 29 are provided on the slide track 24, which supports the projection 16, Fig. 3, or rollers 17, Fig. 4. The wick 30 is secured by two screws 31 upon the slide track 24 on which the chain moves, Fig. 5, and projects through recesses of the same.

The reversal of the moving direction of the container carriers is illustrated in Fig. 2.

As apparent from the above the device moving the containers A along a closed path comprises carriers 2, 8 which are provided with rollers 3, the container carriers being operatively connected with the two engaging members 10, 12 of chain 1; the connection with the engaging members 10 is direct and with the engaging members 12 indirect over control arm 7.

A preferable solution of the problems involved in the use of the chain driven containers consists in the use of substantially T-shaped container carriers having arms 4, these arms being connected with the chain engaging members 10, 12 by a rigidly connected arm 5 and a control arm 7; the carriers are provided with the supporting rollers 3.

The engaging members 10, 12 consist of two plate-shaped upper plates 13 and lower plates 14 which project from the chain 1, the one engaging member 12 carrying pin 9 and the other engaging member 10 carrying the pin 11.

If goods having a small weight are to be transported the support by ridge-shaped projection 16 applied to the lower plate 14 satisfactorily serves the desired transporting purposes; for heavier goods rollers may be used to replace the projections.

In order to protect slide-track 24 against dirt accumulation a protective plate 25 is applied to the chain sliding plane along its entire length said plate 25 projecting between the two plates 13, 14 and being provided with a rounded edge 26.

Since certain changes may be made in the above device and different embodiments of the invention could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patent, is as follows:

1. A device for the transport of containers, comprising an endless chain having two straight portions between two reversal portions, vertical shafts to drive said chain in a horizontal plane, said shafts being located near the chain reversal portions, a carrier for each of said containers adapted to be moved by said chain in the path of travel of said chain including movement in opposite directions along said straight portions, said carrier including a container support, a first arm rigidly connected to said support and a second arm pivoted to said first arm, near the point of interconnection between said support and said first arm, a pair of connecting members in a spaced relation to each other on said chain, the free end of said first arm being pivoted to one of said members, the free end of said second arm being pivoted to the second of said pair of members.

2. In a device according to claim 1, a slide track, said connecting members having upper and lower plates projecting from said endless chain, the upper plates having each a pin and the lower plates being shaped to form a chain support and being located upon and engaging said slide track.

References Cited in the file of this patent

UNITED STATES PATENTS

| | | |
|---|---|---|
| 1,028,751 | Levalley | June 4, 1912 |
| 1,276,007 | Bausman | Aug. 20, 1918 |
| 1,688,551 | Nix et al. | Oct. 23, 1928 |
| 1,723,941 | Krenzke | Aug. 6, 1929 |
| 1,847,524 | Dezendorf | Mar. 1, 1932 |
| 1,871,054 | Hartley | Aug. 9, 1932 |
| 2,253,846 | Cornell | Aug. 26, 1941 |